United States Patent
Yamashita

[19]

[11] Patent Number: 5,892,393
[45] Date of Patent: Apr. 6, 1999

[54] POWER SUPPLY CIRCUIT HAVING AN AUXILIARY POWER SOURCE FOR COMPENSATING FOR MAIN POWER DROP

[75] Inventor: Osamu Yamashita, Tokyo, Japan

[73] Assignee: NEC Corporation, Japan

[21] Appl. No.: 959,250

[22] Filed: Oct. 29, 1997

Related U.S. Application Data

[62] Division of Ser. No. 626,177, Mar. 29, 1996, abandoned.

[30] Foreign Application Priority Data

Mar. 29, 1995 [JP] Japan ................................. 7-070271

[51] Int. Cl.$^6$ ........................................................ G05F 1/10
[52] U.S. Cl. ........................... 327/545; 327/544; 327/530; 307/39; 307/41; 307/48; 307/86; 365/229
[58] Field of Search ................................. 307/38, 39, 41, 307/85, 86, 125, 130, 131, 139, 140, 48; 327/530, 538, 544, 545; 365/229

[56] References Cited

U.S. PATENT DOCUMENTS 4,514,619  4/1985  Kugelman .................................. 307/39
4,575,640  3/1986  Martin ........................................ 307/39
5,157,271  10/1992  Fujiwara .................................... 307/66
5,539,390  7/1996  Horiba et al. ............................... 320/3
5,650,974  7/1997  Yoshimura ................................ 365/229

FOREIGN PATENT DOCUMENTS 62-250876  10/1987  Japan .

*Primary Examiner*—Timothy P. Callahan
*Assistant Examiner*—Jung Ho Kim
*Attorney, Agent, or Firm*—Ostrolenk, Faber, Gerb & Soffen, LLP

[57] ABSTRACT

A power supply circuit is provided with a supplemental power source which is intermittently brought into service each time a main power source is coupled to a high power drain circuit. That is, the supplemental power source is switched to a circuit, which is susceptible to power drop, in response to switching over of the main power source to the high power drain circuit.

4 Claims, 4 Drawing Sheets

5,892,393

POWER SUPPLY CIRCUIT HAVING AN AUXILIARY POWER SOURCE FOR COMPENSATING FOR MAIN POWER DROP

This is a division of application Ser. No. 08/626,177, filed Mar. 29, 1996, now abandoned.

BACKGROUND OF THE INVENTION

1. Field of the Invention

The present invention relates generally to a power supply circuit having a supplemental power source which is intermittently used and which is brought into service each time a main power source is coupled to a high power drain circuit. More specifically, the present invention relates to a power supply circuit wherein the supplemental power source is switched to a circuit, which is susceptible to power drop, in response to switching over of a main power source to a high power drain circuit. The present invention has found extensive use in a power supply circuit of a TDMA (time division multiple access) mobile unit.

2. Description of the Related Art

While the present invention is described in connection with a TDMA mobile radio unit, it will be understood that the present invention may also be applied to a device wherein a high power drain circuit is cyclically energized and induces a relatively large power drop which tends to adversely affect the operation of other circuit(s).

TDMA techniques, in addition to the current extensive use thereof in a satellite communications system, have recently assumed an important role in a mobile digital communications system.

As is well known in the art, in a TDMA mobile communications system, a plurality of mobile units located within a given service area are respectively allowed to communicate with an associated land site using allocated time slots of each consecutive TDMA frame. The time slot used by a given mobile unit has therefore the same period as the TDMA frame. That is, the TDMA mobile unit periodically transmits information within the allocated time slots in short bursts instead of continuously.

Prior to turning to the present invention it is deemed preferable to discuss, with reference to FIG. 1, a known power supply circuit of a TDMA mobile unit to which the present invention is preferably applicable.

A TDMA mobile unit per se is well known in the art and therefore, the overall block diagram thereof is not discussed in detail merely for the purpose of simplifying the discussion. Further, since the present invention is directed to improvements of a power supply circuit, the present invention can readily be understood without reference to signals or data which are used in the TDMA mobile unit and thus, they are omitted from the accompanying drawings for the sake of simplicity.

As shown in FIG. 1, a power source (primary or secondary battery) 10 is coupled so as to supply electric power to an output power amplifier 12 and a frequency synthesizer 14 both of which are arranged in parallel with the battery 10. The battery 10 has its internal resistance depicted by Rin. The power amplifier 12 is to amplify an outgoing signal from the mobile unit and thus consumes a considerable amount of power. Although not shown in FIG. 1, the battery 10 is also coupled to other circuits of the TDMA mobile unit for the purpose of suitable power supply thereto.

A switch 16 is provided between a power line 18 and the output power amplifier 12 in order to implement battery power conservation. More specifically, as mentioned above, the TDMA mobile unit intermittently communicates with an land site using allocated time slots in each consecutive TDMA frame. Therefore, in view of high power drain at the final power amplifier 12, it is highly desirable to supply power thereto only when the power supply is required. To this end, the switch 16 is selectively turned on and off in response to a TDMA transmission timing control signal (depicted by CS) from a controller (not shown).

However, while the power amplifier 12 is energized via the switch 16 which has been closed, a power voltage drop at the line 18 exhibits a relatively large value. This voltage drop tends to undesirably change a reference frequency produced from the frequency synthesizer 14.

The frequency synthesizer 14 is usually configured so as to provide the reference frequency accurate to the required stability over power supply variations. However, it is highly desirable to effectively suppress the power voltage drop in view of its synergistic effects with ambient temperature changes (for example).

For a better understanding of the problem of the above mentioned known power supply circuit, a particular example is given below.

It is assumed that: (a) the voltage of the battery 10 is 4.8V, (b) the internal resistance Rin is 0.5Ω and (c) the current flowing through the power amplifier 12 is 2A. In this instance, when the power amplifier 12 is energized, the voltage appearing at the power line becomes 3.8V (=4.8−0.5×2). The power voltage is therefore lowered by one-volt, which when applied to the frequency synthesizer 14, is liable to undesirably change the reference frequency.

On the other hand, Japanese Laid-open Patent Application No. 62-250876 discloses a supplemental battery which is coupled in parallel with an electrolytic condenser and which is used to compensate for accidental voltage drop or instantaneous power failure on a commercial 3-phase ac (alternate current) power line. That is, the supplemental battery is to compensate for the accidental power drop which adversely affects sequential operations of a voltage invertor which is provided upstream of an ac load such as a 3-phase motor. This related art is not directed to a power supply circuit wherein a supplemental power source is intermittently switched to a circuit susceptible to power drop every time a main power battery supplies power to a high power drain circuit.

It is therefore desired to prevent the intermittently occurring instantaneous potential drop from being supplied to a circuit which is susceptible to such a reduction.

SUMMARY OF THE INVENTION

It is therefore an object of the present invention to provide an improved power supply circuit having a supplemental power source which is intermittently brought into service each time a main power source is coupled to a high power drain circuit.

More specifically, a first aspect of the present invention resides in a power supply circuit comprising: a main power source having a power line extending therefrom; a switch controller; a first switch which is intermittently turned on and off in response to a control signal applied thereto from the switch controller; a high power drain circuit coupled to the power line via the first switch; a second switch; a circuit which is selectively coupled to the power line via the second switch; and an auxiliary power source which is selectively coupled to the power line or the circuit via the second switch, wherein the switch controller controls the first and second switches so as to couple the auxiliary power source to the circuit while the high power drain circuit is coupled to the power line, the switch controller controlling the first and second switches so as to couple the circuit to the power line while the high power drain circuit is isolated from the power line.

A second aspect of the present invention resides in a power supply circuit comprising: a main power source having a power line extending therefrom; a switch controller; a first switch which is intermittently turned on and off in response to a control signal applied thereto from the switch controller; a high power drain circuit coupled to the power line via the first switch; a second switch; a circuit which is selectively coupled to the power line via the second switch; and an auxiliary power source directly coupled to the circuit, the auxiliary power source being selectively coupled to the power line via the second switch, wherein the switch controller controls the first and second switches so as isolate both the auxiliary power source and the circuit from the power line while the high power drain circuit is coupled to the power line, the switch controller controlling the first and second switches so as to couple both the auxiliary power source and the circuit to the power line while the high power drain circuit is isolated from the power line.

A third aspect of the present invention resides in a power supply circuit for use in a TDMA mobile unit wherein a high power drain circuit is intermittently energized for electric power saving. The high power drain circuit is coupled via a first switch to a power line extending from a main power source. The first switch is intermittently turned on and off in response to a TDMA transmission timing control signal applied thereto from a switch controller. The high power drain circuit comprising: a second switch; a circuit which is selectively coupled to the power line via the second switch; and an auxiliary power source which is selectively coupled to one of the power line and the circuit via the second switch. With this arrangement, the switch controller controls the first and second switches so as to couple the auxiliary power source to the circuit while the high power drain circuit is coupled to the power line. Further, the switch controller controls the first and second switches so as to couple the circuit to the power line while the high power drain circuit is isolated from the power line.

A fourth aspect of the present invention resides in a power supply circuit for use in a TDMA mobile unit wherein a high power drain circuit is intermittently energized for electric power saving. The high power drain circuit is coupled via a first switch to a power line extending from a main power source. The first switch is intermittently turned on and off in response to a TDMA transmission timing control signal applied thereto from a switch controller. The high power drain circuit comprising: a second switch; a circuit which is selectively coupled to the power line via the second switch; and an auxiliary power source directly coupled to the circuit, the auxiliary power source being selectively coupled to the power line via the second switch. With the above mentioned arrangement, the switch controller controls the first and second switches so as isolate both the auxiliary power source and the circuit from the power line while the high power drain circuit is coupled to the power line. Further, the switch controller controls the first and second switches so as to couple both the auxiliary power source and the circuit to the power line while the high power drain circuit is isolated from the power line.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 2:
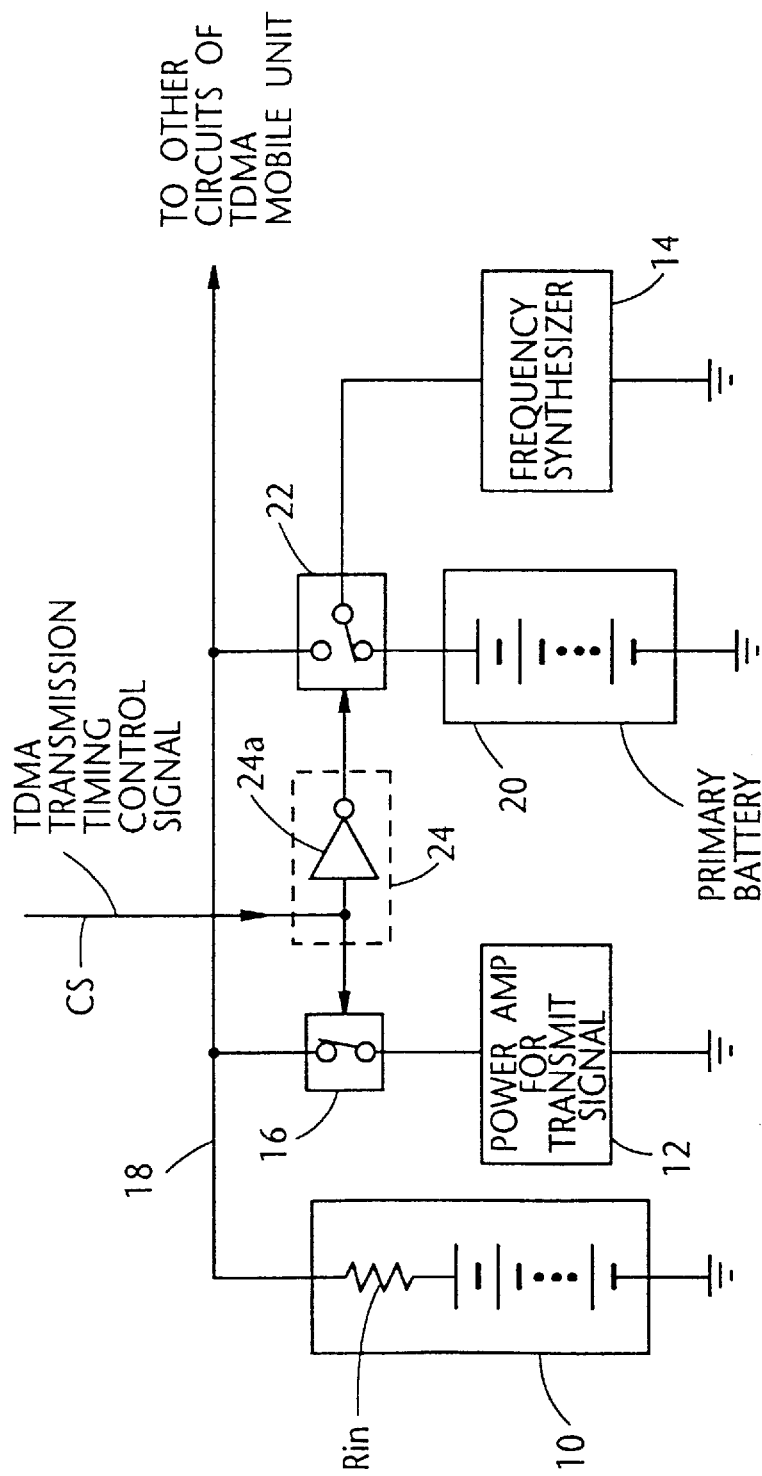
FIG. 2 is a schematic block diagram showing a first embodiment of the present invention.

Reference is now made to FIG. 2, wherein a first embodiment of the present invention is schematically shown in block diagram form.

Figure 1:
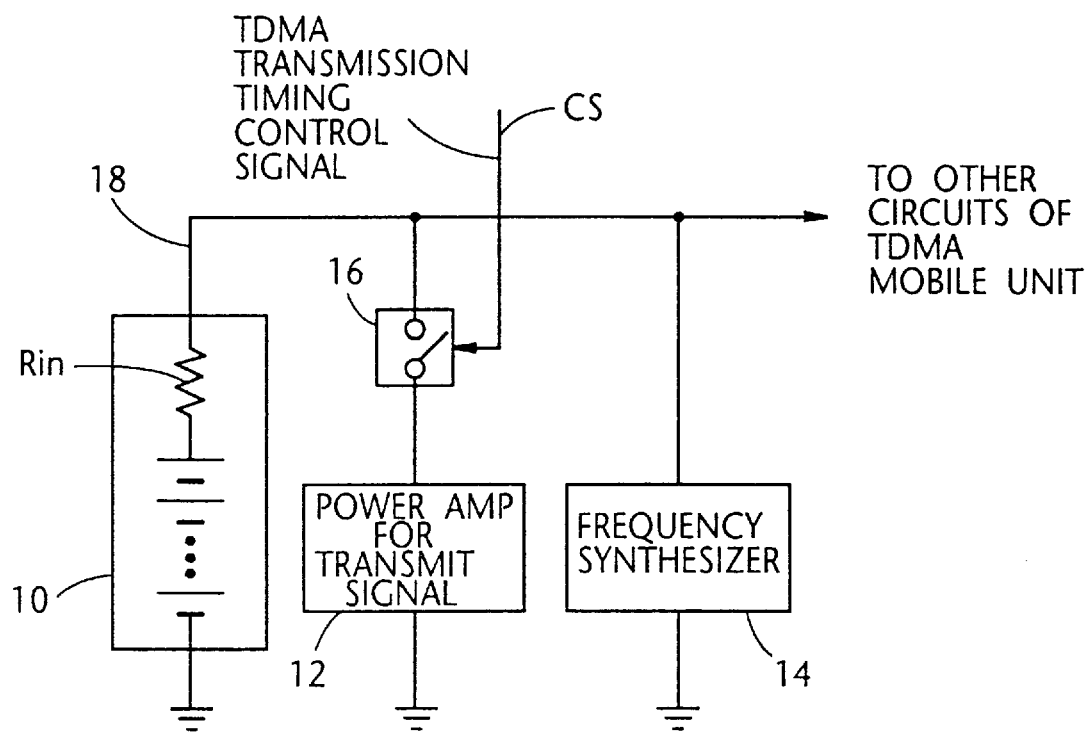
FIG. 1 is a schematic block diagram of the power supply circuit in the vicinity of a power source (battery), referred to in the opening paragraphs.

The first embodiment of FIG. 2 differs from the arrangement of FIG. 1 in that the first embodiment further includes an auxiliary power source 20, a switch 22 and a switch controller 24. The auxiliary power source 20 takes the form of a primary battery in the instant embodiment. The power source 10 may be referred to as a main power source (or main battery) hereinafter.

As mentioned above, the power amplifier 12 consumes much more power than the frequency synthesizer 14 and thus, the main battery 10 should have power capacity larger than the primary battery 20.

The switch controller 24 includes an invertor 24a and operates such as to directly apply the control signal CS to the switch 16 while applying the signal CS after reversing the logic level thereof.

When the TDMA mobile unit including the arrangement of FIG. 2 transmits a signal using an allocated time slot of a given TDMA frame, the control signal CS assumes a high logic level (for example) which closes the switch 16. Thus, the power amplifier 12 is energized by the main battery 10. On the other hand, in this instance, the invertor 24a issues a low logic level which controls the switch 22 so as to disconnect the frequency synthesizer 14 from the power line 18 and couple same to the auxiliary primary battery 20. If the auxiliary battery 20 has the output voltage substantially equal to that of the main battery 10, the lowered power voltage appearing at the power line 18 is successfully prevented from being applied to the frequency synthesizer 14.

On the contrary, while the TDMA mobile unit ceases transmission of a signal, the control signal CS assumes a low logic level which opens the switch 16. Thus, the power amplifier 12 is isolated from the main battery 10. In this case, the invertor 24a issues a high logic level which controls the switch 22 so as to couple the frequency synthesizer 14 to the power line 18. Therefore, the frequency synthesizer 14 is energized by the main battery 10.

Figure 3:
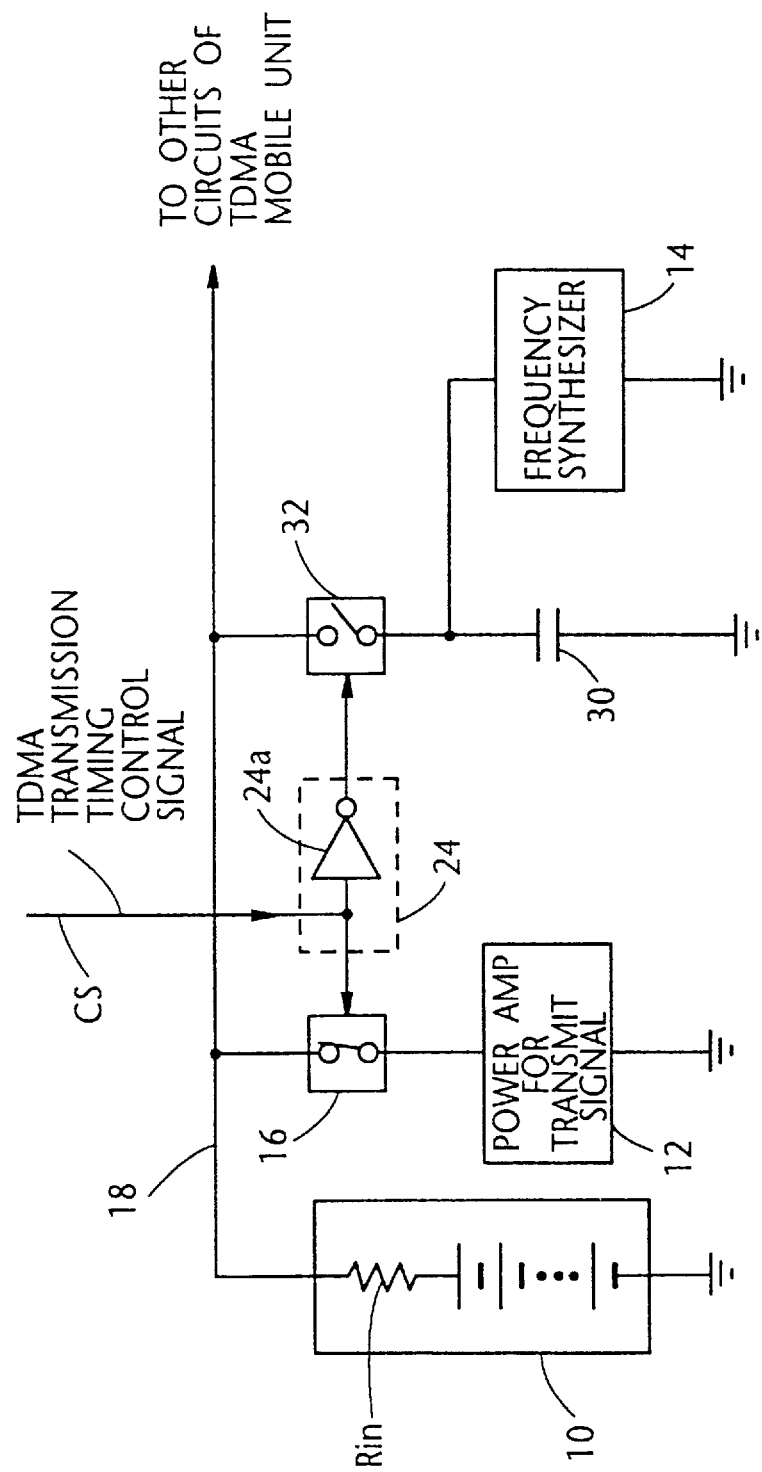
FIG. 3 is a schematic block diagram showing a second embodiment of the present invention.

Referring to FIG. 3, a second embodiment of the present invention is schematically illustrated in block diagram form.

The second embodiment of FIG. 3 includes a capacitor 30 and a switch 32 which respectively correspond to the primary battery 20 and the switch 22 of the first embodiment. Other than this, the second embodiment is substantially identical to the first embodiment and thus, the portions already described with reference to FIG. 2 are not referred to for brevity.

As in the first embodiment, when the TDMA mobile unit including the arrangement of FIG. 3 transmits a signal during an allocated time slot of a given TDMA frame, the control signal CS assumes a high logic level (for example) which closes the switch 16. Thus, the power amplifier 12 is energized by the main battery 10. In this case, the invertor 24a issues a low logic level for opening the switch 32 in order to disconnect the frequency synthesizer 14 from the power line 18 and couple it to the capacitor 30.

As is discussed below, while the power amplifier 12 is isolated by the switch 16 from the main battery 10 and while the capacitor 30 is coupled to the power line 18, the capacitor 30 is sufficiently charged to an extent that it is able to supply an appropriate power to the frequency synthesizer 14. It is therefore understood that the lowered power voltage appearing at the power line 18 due to the energization of the power amplifier 12 is effectively prevented from being applied to the frequency synthesizer 14.

During the time interval for which the TDMA mobile unit ceases transmission of a signal, the control signal CS assumes a low logic level allowing the switch 16 to open. Thus, the power amplifier 12 is separated from the main battery 10. In this instance, the invertor 24a generates a high logic level which closes the switch 32 in order to couple the frequency synthesizer 14 to the power line 18 and also to charge the capacitor 30. This capacitor 30 should be selected so as to be rapidly charged approximately to the main power voltage before the capacitor 30 is again separated from the power line 18.

One example of charging the capacitor 30 is described. As in the prior art, it is assumed that: (a) the voltage of the battery 10 is 4.8V, (b) the internal resistance Rin is 0.5Ω and (c) the current flowing through the power amplifier 12 is 2A. Thus, when the power amplifier 12 is energized, the voltage appearing at the power line falls down to 3.8V (=4.8–0.5×2). Further assuming that: (a) one TDMA frame consists of eight time slots each 577 $\mu$s long, (b) the capacitance of the capacitor 30 is 100 $\mu$F and (c) the frequency synthesizer 14 requires 30 mA. It follows that the electric charges (Q) stored in the capacitor 30 is given by $$Q = 100 \mu F \times 4.8V = 480 \mu C \qquad (1)$$

Further, the amount of electric charges (δQ) flowing into the frequency synthesizer 14 during the time slot for which the power amplifier 12 is energized, is given by $$\delta Q = 30 mA \times 577 \mu s = 17.3 \mu C \qquad (2)$$

Therefore, when the main battery 10 terminates the power supply to the power amplifier 12, the potential (E) of the capacitor 30 with respect to ground level is given by $$E = (480 \mu C - 17.3 \mu C)/100 \mu F = 4.6V \qquad (3)$$

That is, the capacitor 30 is capable of supplying a potential which is sufficient for properly operating the frequency synthesizer 14 while the main battery 10 energizes the power amplifier 12.

Figure 4:
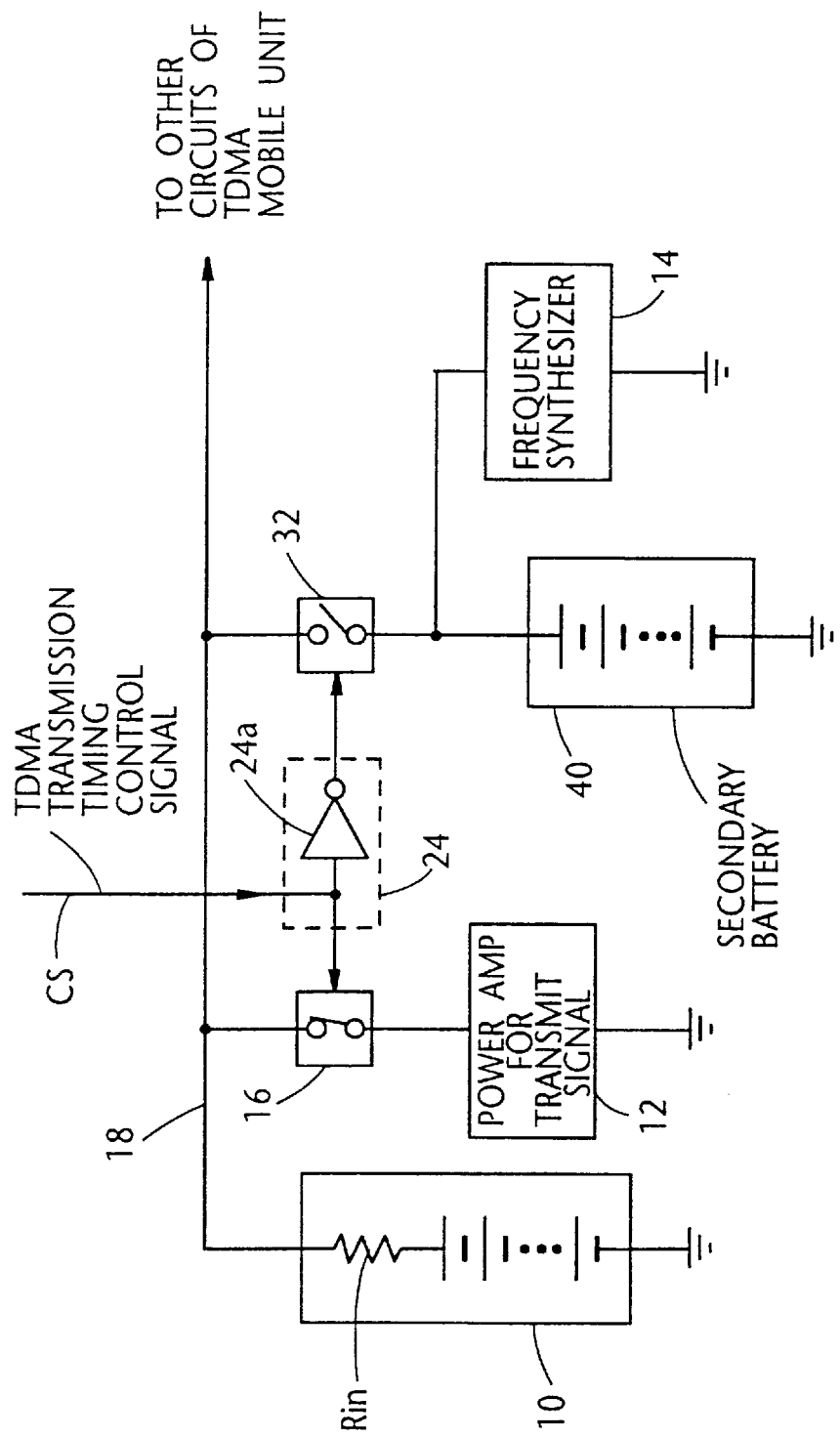
FIG. 4 is a schematic block diagram showing a third embodiment of the present invention.

Referring to FIG. 4, a third embodiment of the present invention is schematically illustrated in block diagram form.

The third embodiment of FIG. 4 differs from the second embodiment in that the third embodiment uses a secondary battery (viz., rechargeable cell) 40 in place of the capacitor 30. Other than this, the third embodiment is substantially identical to the second one.

The secondary battery 40 is able to store a large amount of electric charge as compared with the capacitor 30 (FIG. 3). Thus, when the battery 40 supplies power to the frequency synthesizer 14 during the time for which the switch 32 is open, the electric charge applied to the frequency synthesizer 14 from the secondary battery 40 is very little relative to the whole charge stored in the battery 40 and thus has little influence on decreasing the output voltage of the secondary battery 40. As a result, if the secondary battery 40 is selected which exhibits about 4.8V when fully charged, then the frequency synthesizer 14 is readily recharged to sufficient electrical energy while the power amplifier 12 is in operation.

It will be understood that the above disclosure is representative of only three possible embodiments of the present invention and that the concept on which the invention is based is not specifically limited thereto.

What is claimed is:

1. A power supply circuit for use in a TDMA mobile unit wherein a high power drain circuit is intermittently energized for conserving electric power, said high power drain circuit being coupled via a first switch to a power line extending from a main power source, said first switch being intermittently turned on and off in response to a TDMA transmission timing control signal applied thereto, said power circuit supply comprising:

a second switch;

a switch controller;

a circuit which is selectively coupled to said power line via said second switch; and an auxiliary power source which is selectively coupled to either one of said power line or said circuit via said second switch, wherein said switch controller controls said first and second switches so as to couple said auxiliary power source to said circuit while said high power drain circuit is coupled to said power line, said switch controller controlling said first and second switches so as to couple said circuit to said power line and disconnect said auxiliary power source from said circuit while said high power drain circuit is isolated from said power line.

2. A power supply circuit as claimed in claim 1, wherein said auxiliary power source is a primary battery.

3. A power supply circuit as claimed in claim 1, wherein said high power drain circuit is an output power amplifier for amplifying a transmit signal outputted from said TDMA mobile unit.

4. A power supply circuit as claimed in claim 1, wherein said circuit is a frequency synthesizer.

* * * * *